US011729407B2

(12) United States Patent
Mazumdar et al.

(10) Patent No.: US 11,729,407 B2
(45) Date of Patent: Aug. 15, 2023

(54) SALIENCY-BASED VIDEO COMPRESSION SYSTEMS AND METHODS

(71) Applicant: University of Washington, Seattle, WA (US)

(72) Inventors: Amrita Mazumdar, Seattle, WA (US); Luis Ceze, Seattle, WA (US); Mark H. Oskin, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 17/281,915

(22) PCT Filed: Aug. 6, 2019

(86) PCT No.: PCT/US2019/045306
§ 371 (c)(1),
(2) Date: Mar. 31, 2021

(87) PCT Pub. No.: WO2020/091872
PCT Pub. Date: May 7, 2020

(65) Prior Publication Data
US 2022/0014764 A1 Jan. 13, 2022

Related U.S. Application Data

(60) Provisional application No. 62/752,207, filed on Oct. 29, 2018.

(51) Int. Cl.
*H04N 19/40* (2014.01)
*H04N 19/115* (2014.01)
(Continued)

(52) U.S. Cl.
CPC .......... *H04N 19/40* (2014.11); *G06V 10/462* (2022.01); *G06V 10/993* (2022.01); *G06V 20/46* (2022.01);
(Continued)

(58) Field of Classification Search
None
See application file for complete search history.

(56) References Cited

U.S. PATENT DOCUMENTS 7,436,981 B2   10/2008   Pace
8,437,543 B2   5/2013    Chamaret et al.
(Continued)

FOREIGN PATENT DOCUMENTS

CN   103020985 A    4/2013
WO   2018023734 A1  2/2018
(Continued)

OTHER PUBLICATIONS

Cisco visual networking index: Forecast and methodology, 2016-2021. Technical report, Jun. 6, 2017.
(Continued)

*Primary Examiner* — Samuel D Fereja
(74) *Attorney, Agent, or Firm* — Stoel Rives LLP

(57) ABSTRACT

Examples of systems and methods described herein may provide saliency-based video compression. A saliency map associated with a video may be generated and/or provided. A tile configuration may be selected for the video and quality settings assigned to each tile in accordance with the saliency map. The video may then be compressed (e.g., encoded) in tiles in accordance with the quality settings. Compressed videos may be stored together with saliency metadata, facilitating storage management and/or re-compression.

11 Claims, 4 Drawing Sheets

(51) Int. Cl.
| | |
|---|---|
| *H04N 19/119* | (2014.01) |
| *H04N 19/176* | (2014.01) |
| *G06V 20/40* | (2022.01) |
| *G06V 10/46* | (2022.01) |
| *G06V 10/98* | (2022.01) |
| *G06V 10/25* | (2022.01) |

(52) U.S. Cl.
CPC ........... *G06V 20/49* (2022.01); *H04N 19/115* (2014.11); *H04N 19/119* (2014.11); *H04N 19/176* (2014.11); *G06V 10/25* (2022.01)

(56) References Cited

U.S. PATENT DOCUMENTS

| | | | |
|---|---|---|---|
| 8,526,490 | B2 | 9/2013 | Perlman et al. |
| 2003/0079222 | A1 | 4/2003 | Boykin et al. |
| 2010/0046628 | A1 | 2/2010 | Bhaskaran et al. |
| 2010/0189183 | A1 | 7/2010 | Gu et al. |
| 2011/0255589 | A1 | 10/2011 | Saunders et al. |
| 2013/0195206 | A1 | 8/2013 | Mccarthy |
| 2014/0177706 | A1 | 6/2014 | Fernandes et al. |
| 2015/0117783 | A1 | 4/2015 | Lin et al. |
| 2016/0086052 | A1* | 3/2016 | Piekniewski ............. G06T 3/00 382/103 |
| 2016/0104054 | A1* | 4/2016 | Lin ........................ G06T 11/60 382/192 |
| 2019/0246138 | A1* | 8/2019 | Terterov ................. H04N 19/86 |
| 2020/0050884 | A1* | 2/2020 | Han ....................... G06V 10/25 |

FOREIGN PATENT DOCUMENTS

| | | | |
|---|---|---|---|
| WO | 2018051330 | A1 | 3/2018 |
| WO | WO-2018236715 | A1 * 12/2018 | ....... H04N 21/25891 |

OTHER PUBLICATIONS

Cisco visual networking Index: Forecast and methodology, 2008-2013. Technical report, Jun. 9, 2009.
"Alliance for Open Media (AOM). Av1 software repository", https://aomedia.googlesource.com/aom, last accessed on Jun. 18, 2021, 2018.
"Blender Foundation. Blender open projects", Technical report, 2002. "http://www.blender.org/about/projects/", last accessed on Jun. 18, 2021, 2002, 26 pages.
"Mediakix. The facebook video statistics everyone needs to know", http://mediakix.com/2016/08/facebook-video-statistics-everyone-needs-know/#gs.AVIaT3k, last accessed Jun. 18, 2021, 2016.
"Theano: A Python framework for fast computation of mathematical expressions.", Theano Development Team. arXiv e-prints, abs/1605.02688, May 9, 2016, 19 pages.
Aaron, Anne et al., "High quality video encoding at scale", Netflix Techniogy Blog, Dec. 9, 2015, 6 pages.
Aaron, Anne et al., "Per-title encode optimization", Netflix Technology Blog, Dec. 14, 2015, 13 pages.
Beaver, Doug et al., "Finding a needle in haystack: Facebook's photo storage", In USENIX Symposium on Operating Systems Design and Implementation (OSDI). USENIX Association., Oct. 4, 2010, 14 pages.
Bellard, Fabrice, "FFmpeg. A complete, cross-platform solution to record, convert and stream audio and video", https://ffmpeg.org, Feb. 16, 2017, 27 pages.
Bulling, Andreas et al., "Wearable eog goggles: Seamless sensing and contextawareness in everyday environments", J. Ambient Intell. Smart Environ., 1(2), Apr. 1, 2009, 157-171.
Bylinskii, Zoya et al., "Learning visual importance for graphic designs and data visualizations", In Proceedings of the 30th Annual ACM Symposium on User Interface Software and Technology, UIST '17, New York, NY, USA, 2017. ACM., Aug. 8, 2017, 57-69.
Bylinskii, Zoya et al., "Where should saliency models look next?", In Bastian Leibe, Jiri Matas, Nicu Sebe, and Max Welling, editors, European Conference on Computer Vision (ECCV). Springer International Publishing, 2016, Sep. 16, 2016, 16 pages.
Chollet, François et al., "Keras", https://keras.io, Mar. 27, 2015.
Cornia, Marcella et al., "A Deep Multi-Level Network for Saliency Prediction", In International Conference on Pattern Recognition (ICPR), 2016, Sep. 5, 2016, 6 pages.
De Cock, Jan et al., "A large-scale video codec comparison of x264, x265 and libvpx for practical VOD appiications", In Applications of Digital Image Processing XXXIX, vol. 9971, p. 997116. International Society for Optics and Photonics, 2016, Sep. 27, 2016, 18 pages.
Fan, Ching-Ling et al., "Fixation prediction for 360° video streaming in headmounted virtual reality", In Proceedings of the 27thWorkshop on Network and Operating Systems Support for Digital Audio and Video, NOSSDAV'17, New York, NY, USA, 2017. ACM., Jul. 10, 2017, pp. 67-72.
Fontana, Robert E. et al., "Moore's law realities for recording systems and memory storage components: Hdd, tape, nand, and optical", AIP Advances, 8(5):056506, 2018, Dec. 19, 2017, 6 pages.
Fouladi, Sadjad et al., "Encoding, fast and slow: Low-latency video processing using thousands of tiny threads", In 14th USENIX Symposium on Networked Systems Design and Implementation (NSDI 17), Boston, MA, 2017. USENIX Association., Mar. 2017, pp. 363-376.
Fouladi, Sadjad et al., "Salsify: Lowlatency network video through tighter integration between a video codec and a transport protocol", In 15th USENIX Symposium on Networked Systems Design and Implementation (NSDI 18), Renton,WA, 2018. USENIX Association., Apr. 9, 2018, pp. 267-282.
Guo, Chenlei et al., "A novel multiresolution spatiotemporal saliency detection model and its applications in image and video compression", IEEE Transactions on Image Processing, 19(1), Jan. 1, 2010, 185-198.
Gupta, Rupesh et al., "Visual saiiency guided video compression algorithm", Signal Processing: Image Communication, 28(9), Oct. 1, 2013, 1006-1022.
Hadizadeh, Hadi et al., "Saliency-aware video compression", IEEE Transactions on Image Processing, 23(1), Sep. 20, 2013, 19-33.
Haynes, Brandon et al., "LightDB:a DBMS for virtual reality", Proc. VLDB Endow., 11(10), Jul. 1, 2018, 1192-1205.
Haynes, Brandon et al., "Visualcloud demonstration: A dbms for virtual reality", In Proceedings of the 2017 ACM International Conference on Management of Data, SIGMOD '17, New York, NY, USA, 2017. ACM., May 9, 2017, 1615-1618.
Huang, Qi et al., "Sve: Distributed video processing at facebook scale", In Proceedings of the 26th Symposium on Operating Systems Principles, SOSP '17, New York, NY, USA, 2017. ACM., Oct. 28, 2017, pp. 87-103.
Huang, Xun et al., "Salicon: Reducing the semantic gap in saliency prediction by adapting deep neural networks", In 2015 IEEE International Conference on Computer Vision (ICCV), Feb. 17, 2015, pp. 262-270.
Jevdjic, Djordje et al., "Approximate storage of compressed and encrypted videos", In Proceedings of the Twenty-Second International Conference on Architectural Support for Programming Languages and Operating Systems, ASPLOS '17, New York, NY, USA, 2017. ACM., Apr. 4, 2017, pp. 361-373.
Jiang, Lai et al., "DeepVS: A Deep Learning Based Video Saliency Prediction Approach", European Conference on Computer Vision, 15th European Conference, Munich, Germany, Sep. 8-14, 2018, Sep. 2018, 16 pages.
Kantorov, Vadim et al., "Efficient feature extraction, encoding and classification for action recognition", In Proc. Computer Vision and Pattern Recognition (CVPR), IEEE, 2014, Jun. 2014, 8 pages.
Katsavounidis, Ioannis, "Dynamic optimizer—a perceptual video encoding optimization framework", Netflix Technology Blog; Technical report, 2018, Mar. 5, 2018, 22 pages.
Lee, Jong-Seok et al., "Perceptual video compression; A survey", IEEE Journal of Selected Topics in Signal Processing, 6(6), Aug. 23, 2012, 684-697.
Li, Zhi et al., "Toward a practical perceptual video quality metric", Netflix Technology Blog, Technical report, 2016, Jun. 6, 2016, 22 pages.

(56) References Cited

OTHER PUBLICATIONS

Li, Zhicheng et al., "Visual attention guided bit allocation in video compression", Image and Vision Computing, 29(1), Jan. 1, 2011, 1-14.
Liu, Peng et al., "Greening the video transcoding service with low-cost hardware transcoders", In 2016 USENIX Annual Technical Conference (USENIX ATC 16), Denver, CO, 2016. USENIX Association., Jun. 22, 2016, 407-419.
Lo, Wen-Chih et al., "360° video viewing dataset in head-mounted virtual reality", In Proceedings of the 8th ACM on Multimedia Systems Conference, MMSys'17, New York, NY, USA, 2017. ACM., Jun. 20, 2017, pp. 211-216.
Lottarini, Andrea et al., "Vbench: Benchmarking video transcoding in the cloud", In Proceedings of the Twenty-Third International Conference on Architectural Support for Programming Languages and Operating Systems, ASPLOS'18, New York, NY, USA, 2018. ACM., Mar. 19, 2018, pp. 797-809.
Lu, Yao et al., "Optasia: A relational platform for efficient large-scale video analytics", In Proceedings of the Seventh ACM Symposium on Cloud Computing, SoCC '16, New York, NY, USA, 2016. ACM., Oct. 5, 2016, pp. 57-70.
Lyudvichenko, Vitaliy et al., "A semiautomatic saliency model and its application to video compression", In 2017 13th IEEE International Conference on Intelligent Computer Communication and Processing (ICCP), Sep. 7, 2017, pp. 403-410.
Magaki, Ikuo et al., "ASIC clouds: Specializing the datacenter", In Proceedings of the 43rd International Symposium on Computer Architecture, ISCA '16, IEEE Press, Piscataway, NJ, USA, 2016., Jun. 18, 2016, pp. 178-190.
Manohara, Megha et al., "Optimized shotbased encodes: Now streaming!", Nexflix Technology Blog; Technical report, 2018., Mar. 9, 2018, 9 pages.
Mazumdar, Amrita et al., "Perceptual Compression for Video Storage and Processing Systems", ACM Symposium on Cloud Computing (SoCC), Santa Cruz, California, Nov. 20-23, 2019, 63 pages.
Mazumdar, Amrita et al., "Vignette: Perceptual Compression for Video Storage and Processing Systems", arXiv, Feb. 4, 2019, 14 pages.
Misra, Kiran et al., "An overview of tiles in HEVC", IEEE Journal of Selected Topics in Signal Processing, 7(6), Jun. 27, 2013, 969-977.
Muralidhar, Subramanian et al., "f4: Facebook's warm BLOB storage system", In 11th USENIX Symposium on Operating Systems Design and Implementation (OSDI 14), Broomfield, CO, 2014. USENIX Association., Oct. 6, 2014, pp. 383-398.
Norkin, Andrey et al., "More efficient mobile encodes for Netflix downloads", Netflix Technology Blog: Technical report, 2018., Dec. 1, 2016.
Poms, Alex et al., "Scanner: Efficient video analysis at scale", ACM Trans. Graph., 36(4), May 18, 2018, 13 pages.
Redmon, Joseph et al., "YOLO9000: better, faster, stronger", In CVPR, Dec. 25, 2016, pp. 6517-6525.
Ryoo, Jihoon et al., "Design and evaluation of a foveated video streaming service for commodity client devices", In Proceedings of the 7th International Conference on Muitimedia Systems, MMSys '16, New York, NY, USA, 2016. ACM., May 10, 2016, pp. 6:1-6:11.
Shen, Haichen et al., "Fast video classification via adaptive cascading of deep models", In 2017 IEEE Conference on Computer Vision and Pattern Recognition, CVPR 2617, Honolulu, HI, USA, Jul. 21-26, 2017, pp. 2197-2205.
Sitzmann, Vincent et al., "Saliency in VR: How do people explore virtual environments?", IEEE Transactions on Visualization and Computer Graphics, 24(4), Jan. 25, 2018, 1633-1642.
Sullivan, Gary J. et al., "Overview of the high efficiency video coding (HEVC) standard", IEEE Transactions on Circuits and Systems for Video Technology, 22(12), Sep. 28, 2012, 1649-1668.
Tang, Linpeng et al., "Popularity prediction of facebook videos for higher quality streaming", In 2017 USENIX Annual Technical Conference (USENIX ATC 17), Santa Clara, CA, 2017. USENIX Association., Jul. 12, 2017, pp. 111-123.
Whitmire, Eric et al., "Eyecontact: Scleral coil eye tracking for virtual reality", In Proceedings of the 2016 ACM International Symposium on Wearable Computers, ISWC '16, New York, NY, USA, 2016. ACM., Sep. 12, 2016, pp. 184-191.
Zhang, Haibo et al., "Race-to-sleep + content caching + display caching: A recipe for energy-efficient video streaming on handhelds", In Proceedings of the 50th Annual IEEE/ACM International Symposium on Microarchitecture, MICRO-50 '17, New York, NY, USA, 2017. ACM., Oct. 14, 2017, pp. 517-531.
Zhang, Haoyu et al., "Live video analytics at scale with approximation and delay-tolerance", In 14th USENIX Symposium on Networked Systems Design and Implementation, NSDI 2017, Boston, MA, USA, Mar. 27-29, 2017, Mar. 27, 2017, pp. 377-392.
Zund, Fabio et al., "Content-aware compression using saliency-driven image retargeting", In Image Precessing (ICIP), 2013 20th IEEE International Conference on, IEEE, 2013., Sep. 15, 2013, pp. 1845-1849.
International Search Report and Written Opinion for Application No. PCT/US2019/045306, dated Dec. 3, 2019.

\* cited by examiner

US 11,729,407 B2

SALIENCY-BASED VIDEO COMPRESSION SYSTEMS AND METHODS

CROSS-REFERENCE TO RELATED APPLICATION(S)

This application is a 35 U.S.C. § 371 National Stage Application of PCT Application No. PCT/US2019/045306, filed on Aug. 6, 2019, which claims the benefit of U.S. Provisional Application No. 62/752,207, filed Oct. 29, 2018, the entire contents of which are hereby incorporated by reference herein.

STATEMENT REGARDING RESEARCH & DEVELOPMENT

This invention was made with government support under Grant No. CCF1703051, awarded by the National Science Foundation. The government has certain rights in the invention.

TECHNICAL FIELD

Examples described herein relate to the compression and storage of video data. Examples are described which assign quality metrics to tiles based on saliency maps for compression of video data by tiles.

BACKGROUND

Compressed videos constitute 70% of Internet traffic, and video upload growth rates far outpace compute and storage improvement trends. Leveraging perceptual cues like saliency, e.g., regions where viewers focus their perceptual attention, can reduce compressed video size while maintaining perceptual quality, but requires significant changes to video codecs and ignores the data management of this perceptual information.

New domains of video production e.g., panoramic (360), stereoscopic, and light field video for virtual reality (VR)—demand higher frame rates and resolutions, as well as increased dynamic range. Further, the prevalence of mobile devices with high-resolution cameras makes it increasingly easy for humans to capture and share video.

For decades, video codecs have exploited how humans see the world, for example, by devoting increased dynamic range to spatial features (low frequency) or colors (green) we are more likely to observe. One such perceptual cue is saliency, or visual content importance. Saliency describes where, in a video frame, a viewer focuses their perceptual attention. As video data grows to larger fields of view and more immersive resolutions, e.g., 360 video and 8K VR displays, the salient regions of a video shrink to smaller proportion of the video frame. Video encoders can leverage saliency information by concentrating bits in more perceptually interesting visual areas. Prior work, however, focuses only on achieving bitrate reduction or quality improvement at the cost of complicated systems designed for a single codec implementation.

DETAILED DESCRIPTION

Figure 1:
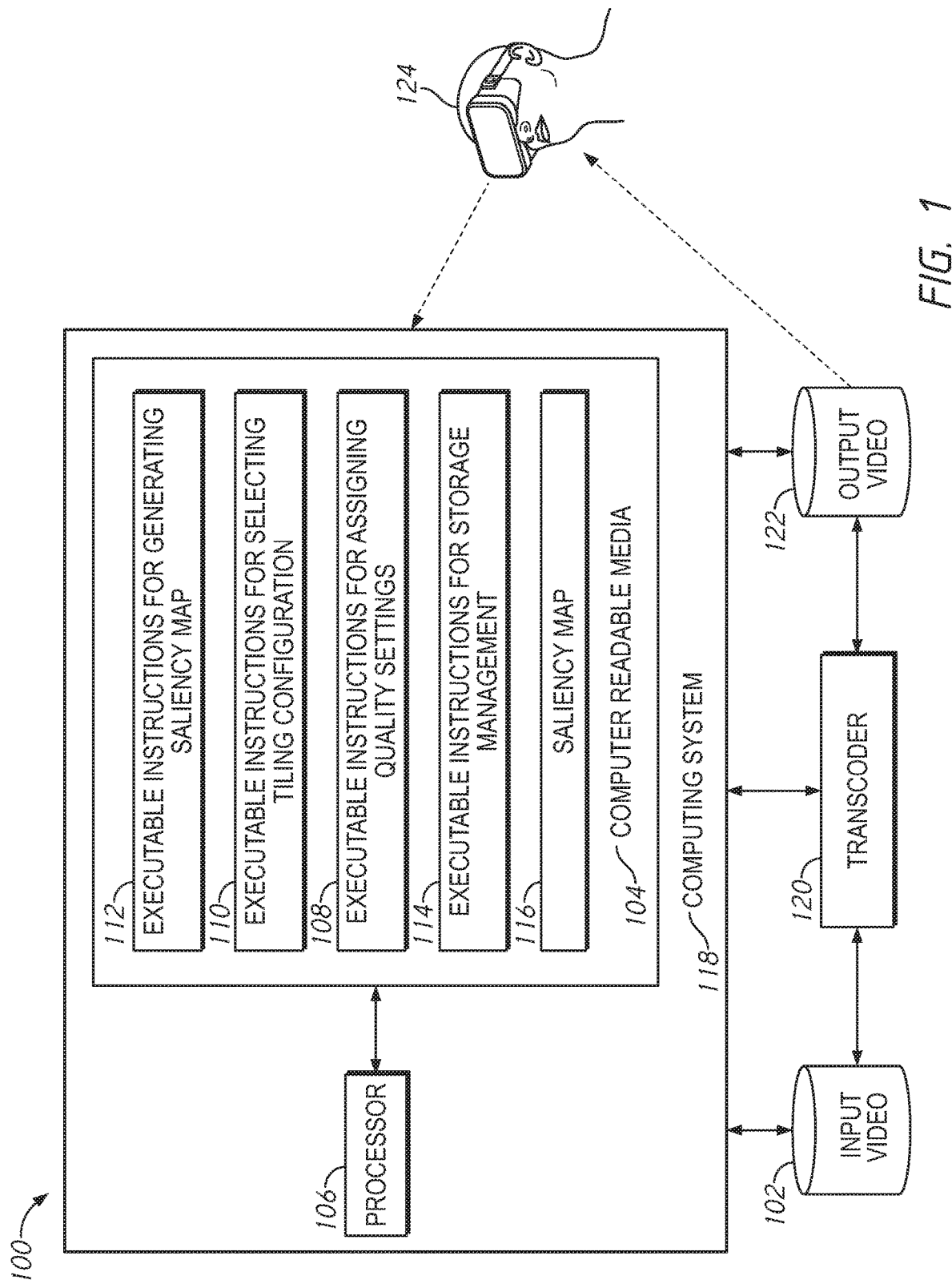
FIG. 1 is a schematic illustration of a system arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples described herein include compression techniques and storage managers for perception-based video compression. Examples described herein may complement off-the-shelf compression software and hardware codec implementations in some examples. Compression techniques described herein may utilize a neural network or other method to predict saliency or other perceptual information used during transcoding. An example storage manager may integrates perceptual information into the video storage system to support changes to perceptual compression and/or a perceptual compression feedback loop.

Examples of saliency-based optimizations described herein may reduce storage by up to 95% with minimal quality loss in some examples. Videos stored in accordance with examples described herein may lead to power savings of 50% on mobile phones during video playback in some examples. Such results may be achieved in part by integrating information about the human visual system (e.g., saliency maps) into the architecture of video storage systems.

Examples described herein may provide a video storage system that leverages perceptual information to reduce video sizes and bitrates. Example systems may accordingly serve as a backend for largescale video services, such as content delivery systems or social media applications. Examples described herein may have components: a compression scheme and a storage manager. Examples of storage managers may leverage saliency in a perception-based compression algorithm that may achieve up to 95% lower bitrates in some examples while minimally reducing quality.

Examples of storage managers described herein may utilize a simple API to trigger saliency-based compression when needed, allowing applications to tradeoff between faster traditional compression and the system's smaller video sizes. Example systems may utilize low-overhead metadata, may be easily integrated into existing media storage structures, and may remain transparent to standard video applications. Examples of storage managers may support generating saliency maps with a neural network in some examples as well as integrating perceptual information from, e.g., VR headsets or other eye tracking devices to improve the quality of its perceptual compression.

Examples of systems described herein may not necessarily utilize a specially designed standalone codec or compression standard. Instead, examples described herein may be utilized with existing codecs in some examples to take advantage of the untapped perceptual compression potential of video content, which may be advantageous for, e.g., high-resolution video served in VR and entertainment settings. As a result, off-the-shelf software and hardware accelerators may be used to decompress the perceptually compressed videos described herein with no modifications in some examples. An example implementation was built on top of LightDB, a database management system for video.

Example systems described herein may accordingly support perceptual video compression. Systems are described for producing and managing perceptually compressed video data. Example systems may produce videos that are 80-95% smaller than standard videos, consume 50% less power during playback, and demonstrate minimal and/or reduced perceived quality loss.

Example systems described herein may provide a forward-compatible encoding pipeline. Example systems may leverage existing features of modern video codecs to implement perceptual compression, and can be deployed in generally any video processing system that supports such codecs, such as HEVC or AV1.

Example systems described herein may provide custom storage for perceptual data. Examples of storage managers described herein may efficiently store and manages perceptually compressed videos and may be integrated in a modern video processing database system. Storage managers may support both a heuristic-guided search for fast perceptual compression and an exhaustive mode to compute an improved and/or optimal saliency-based compression configuration.

It is to be understood that not all examples of the claimed technology may exhibit all, or even any, of the benefits or advantages described herein. Instead, example benefits or advantages are provided to facilitate appreciation of example uses of the described technology. Examples described herein provide for storage management of perceptually-compressed video information. Saliency-based compression in a video storage system has been investigated with a collection of modern and high-resolution video datasets. Using a neural network trained to predict content saliency and an off-the-shelf HEVC encoder, examples of the described saliency-based compression scheme can reduce bitrate requirements by 80-95%. Results showed that example systems described herein may reduce whole-system power dissipation by 50% on a Google Pixel 2 phone during video playback. Quantitative evaluation and user study results indicated that these bitrate and power savings come at no perceived loss in video quality.

FIG. 1 is a schematic illustration of a system arranged in accordance with examples described herein. The system 100 includes input video 102, computing system 118, transcoder 120, and output video 122. The system 100 may further includes perceptual information source 124. The computing system 118 may include processor 106, computer readable media 104, and/or saliency map 116. The computer readable media 104 may include executable instructions for assigning quality settings 108, executable instructions for selecting tiling configuration 110, executable instructions for generating saliency map 112, and/or executable instructions for storage management 114. The components shown in FIG. 1 are illustrated by way of example. Additional, fewer, and/or different components may be used in other examples.

Generally, the computing system 118 may receive input video 102 or portions thereof as input. The computing system 118 may analyze input video 102 and may generate saliency map 116, select one or more tiling configurations, and/or assign quality settings to all or portions of input video 102 based on saliency map 116. The computing system 118 may be in communication with transcoder 120. The transcoder 120 may receive the input video 102 and may transcode the input video 102 based on settings (e.g., tiling configuration and/or quality settings) received from the computing system 118. The transcoder 120 may accordingly provide output video 122, which may be a compressed (e.g., encoded) version of the input video 102. In some examples, the perceptual information source 124 may be used to provide additional perceptual information to the computing system 118 based on the output video 122. The additional perceptual information may be used to update the saliency map 116 and/or make other changes in the operation of the computing system 118.

The system 100 of FIG. 1 may form all or a portion of a large-scale video system. Uses of large-scale video systems generally fall into two classes: entertainment streaming, and serving social media videos. Saliency-based compression can be used to implement either or both. Content delivery networks (CDNs) for entertainment services—e.g., Netflix, Amazon Video, etc.—generally maintain small numbers of videos to be streamed at many resolutions and bitrates. In contrast, social media services may maintain a vast video library from many users, and focus on reducing latency for processing and network transmission. For social media, saliency-base compression can reduce outbound network bandwidth, whereas, for entertainment services, it may reduce the storage cost of maintaining many bitrates and resolution scales of these videos. As perceptual trackers, e.g., VR headsets, become more popular, saliency-based compression can use eye gaze information to further improve compression information. This feedback loop can be used to tune saliency-based compression as an initially viral video decreases in popularity, or to reduce bandwidth while streaming video to a 360 degree video player. All or portions of the system 100 may be implemented as a cloud-based service in some examples. For example, the input video 102 may be received by the computing system 118 of FIG. 1 from one or more external sources (e.g., users, other computing systems, content providers, etc.). The computing system 118 and/or transcoder 120 may be a cloud provider system providing video compression and/or storage techniques described herein as a service to provide output video 122. While in some examples the compression and/or storage techniques described herein may be implemented as a cloud-based service, in other examples they may be implemented using an enterprise server or other dedicated computing resources.

Examples described herein may accordingly operate on input videos, such as input video 102 of FIG. 1. Generally any number or kind of input videos, and/or segments of input videos may be processed (e.g., compressed and/or stored) in accordance with examples described herein. The input video 102 may be stored (e.g., in one or more storage devices, such as memory, disk drives, or other computer readable media).

Examples described herein may include a computing system, such as computing system 118 of FIG. 1. The computing system may analyze one or more input videos to provide a saliency map, tiling configuration, and/or quality settings for the input video(s), or video segment(s) thereof. The computing system 118 may access the input video 102 over a communication medium, such as a network using a wired or wireless connection.

The computing system 118 may be implemented using one or more computers, servers, desktops, tablets, mobile phones, appliances, automobiles, or generally any device having computational capability. The computing system 118 may generally include one or more processors, such as processor 106. The processor 106 may be implemented using, for example, one or more central processing unit(s) (CPUs), graphics processing unit(s) (GPUs), any number of processor cores, controllers, microcontrollers, and/or other processing circuitry. The computing system 118 may include one or more computer readable media, such as computer readable media 104. The computer readable media 104 may be implemented using one or more memory devices (e.g., read only memory (ROM), random access memory (RAM), disk drives, solid state storage).

The computer readable media 104 may store data generated and/or used by examples of systems described herein, such as saliency map 116. Saliency generally refers to a measure of the perceptual importance of visual information. Saliency data generally refers to data indicative of the perceptual importance of information, which may be encoded in a video, such as identification of foreground and background or primary and secondary objects. Video codecs may traditionally use certain information, like motion and luminance, to improve compression performance. New modes of video viewing (such as with a VR headset) may introduce the opportunity to integrate richer cues from the human system, such as saliency.

The computer readable media 104 may store executable instructions, which when executed by processor 106 or other processing devices, may cause the computing system 118 to perform certain operations. In this manner, examples described herein may be implemented using software. Additionally or instead, examples described herein may be implemented using circuitry (e.g., one or more field programmable gate arrays (FPGAs), and/or application specific integrated circuits (ASICs). While shown as a single computer readable media 104 in FIG. 1, any number may be used in some examples. While the executable instructions for selecting tiling configuration 110, executable instructions for generating saliency map 112, executable instructions for assigning quality settings 108, executable instructions for storage management 114, and saliency map 116 are all depicted in computer readable media 104 in the example of FIG. 1 it is to be understood that their physical arrangement of storage is quite flexible, and they may be distributed across any number of media devices, and may be stored together and/or separate in some examples. In some examples two different computing systems may be provided—one which may implement a compression system (e.g., in accordance with executable instructions for selecting tiling configuration 110, executable instructions for generating saliency map 112, and/or executable instructions for assigning quality settings 108) and a second which may implement a storage manager (e.g., in accordance with executable instructions for storage management 114). The compression system may operate in conjunction with a transcoder (e.g., codec), such as transcoder 120. The storage manager may operate in conjunction with stored output video files and/or segments (e.g., output video 122). Examples of compression systems may compresses videos by enumerating configurations of video tiles and saliency-quality correspondences to maximize quality while minimizing video size. Compression systems may be implemented together with known encoding techniques (e.g., HEVC). Examples of storage managers may manage perceptual information as metadata which may be embedded within videos and/or video segments or maintained in storage. This may reduce storage complexity for data management and may allow for the stored data to be transparent to saliency-unaware video applications such as VLC or Optasia. Storage managers may use a neural network to generate saliency information or collect them from end-user video viewing devices. Example storage managers may provide: (1) low-overhead perceptual metadata transmitted alongside video content, without impeding the functionality of applications that choose not to use it in some examples, (2) storage management policies to trigger one-time perceptual compression in some examples, (3) support for refining perceptual video compression with cues from user viewing devices in some examples, and (4) a heuristic-based search for faster perceptual compression.

Generally, compression systems described herein may include and/or execute executable instructions for generating saliency map 112, executable instructions for selecting tiling configuration 110, and executable instructions for assigning quality settings 108. Compression systems may utilize off-the-shelf video codec features in some examples to encode perceptual information and improve coding efficiency. Example techniques accordingly takes a video as input (e.g., input video 102), generate intermediate saliency maps for frames of the video, and aggregates the per-frame intermediate saliency maps into a single video saliency map (e.g., saliency map 116). Compression systems may transcode the input video with a tiled encoding, where the quality of each tile corresponds to the saliency of the same tile in the video saliency map.

Examples of systems described herein, such as computing system 118 of FIG. 1 may generate saliency maps for one or more videos and/or video segments. For example, the computing system 118 may generate saliency map 116 for input video 102 by having the processor 106 execute executable instructions for generating saliency map 112. While in some examples, the computing system 118 may generate the saliency map 116, in other examples, the saliency map 116 may be provided e.g., from storage which may be co-located with the input video 102 and/or from another location, system, or process. Videos described herein (such as input video 102) may be divided (e.g., by computing system 118) into video segments for processing. Each video segment may generally contain a keyframe and an ensuing set of predicted frames of video. The video segment may have a particular duration less than a full video (e.g., 10-20 seconds, 12-18 seconds, 6-12 seconds, 5-10 seconds, or another value).

The executable instructions for generating saliency map 112 may generally implement any of a variety of saliency-detection algorithms which may highlight visually significant regions or objects in an image. A saliency map, such as saliency map 116, may generally include data representative of visual attention. In some examples, a saliency map may be implemented in the form of a heatmap, where the map's values correspond to the salience of pixels in a frame of a video file and/or video segment. In some examples, saliency maps may be visualized as grayscale video frames or heatmaps. Saliency maps may be generated, for example using deep learning or other techniques together with, eye tracker-generated fixation maps to effectively predict saliency, such as for natural images.

In some examples, the executable instructions for generating saliency map 112 may utilize a machine learning algorithm, such as MLNet to automatically generate a corresponding saliency map for a video input (e.g., video file or segment). MLNet uses Keras with Theano to perform saliency prediction from video frames, however other techniques may also be used. The process may include decoding the video and processing frames through a neural network to produce saliency maps (e.g., saliency map 116).

The saliency map 116 may be provided in a variety of forms. Generally, a saliency map may include a saliency value for each pixel (or combination of pixels) in a video file or segment thereof. In some examples, an intermediate saliency map may be provided for each frame of a video or video segment. The saliency map 116 may reflect a combination of multiple intermediate saliency maps for each frame in a video or video segment. Generally, the saliency map may be a collection of values (e.g., 0-255 in some examples) reflecting the saliency of a given pixel or group of pixels in a frame, video segment, or video. The executable instructions for generating saliency map 112 may include instructions for generating saliency map 116 from multiple intermediate saliency maps. For example, the executable instructions for generating saliency map 112 may include instructions for collecting a maximum saliency for each pixel in the frame across the plurality of intermediate saliency maps to generate saliency map 116. For example, the computing system 118 may, in accordance with executable instructions for generating saliency map 112, accumulate the intermediate (e.g., per frame) saliency maps into a single map by collecting maximum saliency for each pixel in the frame across the video file or segment. These aggregated saliency values produce a single saliency map of importance across the video. In some examples, input videos may be divided (e.g., chunked) into segments (e.g., 10-20 seconds of video) for better coding efficiency, these video saliency maps may capture aggregate saliency information without oversaturating the saliency heatmap.

Once a saliency map for an input video is provided, it may be used to perceptually encode videos with the tiling feature of a transcoder (e.g., an HEVC codec). To produce saliency-based tiled video encoding, a video segment may be divided spatially into tiles and then each tile may be mapped to a quality setting. The saliency map's value at each tile may determines the tile's quality setting. A saliency map may be accessible to a system for each video, video file, and/or video segment supported by the computing system.

Examples of systems described herein, such as computing system 118 of FIG. 1 may select a tiling configuration for a video and/or video segment. Generally, a tiling configuration may refer to a division of one or more frames of video data into tiles, each of the tiles associated with a particular number of rows and columns of the frame. While generally square or rectangular tiles are used, other tile shapes may be used in other examples. In some examples, the tiling configurations (e.g., tiling patterns) may be rectangular tiles with uniform width and height across the video frame. The same tile configuration may be used throughout an entire video segment (e.g., 10-20 seconds of video) in some examples, however, in other examples, the tiling configuration may change during the video segment. The executable instructions for selecting tiling configuration 110 may specify a number of rows and columns in each tile of a tiling pattern based on an exhaustive search of all tile configurations in some examples and/or a heuristic-guided search in some examples.

Generally, each video tile (e.g., spatial video tiles), may be encoded by a transcoder (e.g., a codec) independently. Tiling a video divides a single video segment and/or file into independent regions (e.g., tiles) that may be encoded as separate decodable streams. Using tiles may allow encoders to code tiles at separate qualities and/or bitrates and allows decoders to decode tiles in parallel. Video tiles may be supported by standard encoding software. In some examples, standard tile implementations may be used which may encode tiles in rectangular regions and may not leverage motion across tiles during an encoding process. This may facilitate compatibility with existing codecs (e.g., HEVC and/or AV1 codecs).

The computing system 118 may select a tiling configuration by having the processor 106 execute executable instructions for selecting tiling configuration 110. In some examples, the computing system 118 may evaluate a number of candidate tiling configurations by compressing one or more video segments in tiles each of the candidate tiling configurations and evaluating metrics of the candidate tiling configurations. Metrics such as bitrate, video quality, or combinations thereof may be used. A candidate tiling configuration may be selected based on the metrics (e.g., a candidate tiling configuration may be selected which provides the most advantageous bitrate, video quality, or combination thereof of the set of candidate tiling configurations).

Examples described herein, such as computing system 118 of FIG. 1 may assign one or more quality settings for each tile in a tiling configuration for a video and/or video segment. The quality settings may be assigned to tiles using the saliency map (e.g., saliency map 116). For example, the computing system 118 may assign quality settings by having the processor 106 execute executable instructions for assigning quality settings 108. In some examples, the executable instructions for assigning quality settings 108 may specify that a target bitrate or constant rate factor be assigned to selected tiles associated with a highest subset of saliency values in the saliency map 116. The executable instructions for assigning quality settings 108 may additionally or instead specify that a minimum bitrate be assigned to a lowest subset of saliency values in the saliency map. In some examples, selecting a video encoding quality that corresponds to a tile's saliency value may include determining how video quality should be expressed during encoding and how saliency should correspond with that quality measure. In an HEVC example, each tile may be encoded at a single quality or bitrate setting throughout the video stream and/or segment, so per-tile encoding qualities may be used. HEVC exposes different modes of controlling quality and bitrate, such as constant bitrate or constant rate factor, with varying levels of effort and efficiency. In a simple example, a perceptually-controlled version of a target bitrate may be used, where the target bitrate either corresponds to the bitrate of the original video or is specified by an API call or other information provided to the computing system. The highest saliency tiles in the video may be assigned the target bitrate, and tiles with lower saliency are assigned lower bitrates, with a minimum bitrate of a particular threshold percentage (e.g., 15%, 10%, 5%) of the original video bitrate. In some examples, target bitrate may not be used and a codec's quality control setting may instead or additionally be used (e.g., constant rate factor).

Accordingly, computing systems described herein, such as computing system 118 of FIG. 1, may provide a saliency map, tiling configuration, and/or quality settings for one or more input videos and/or segments thereof. The tiling configuration and/or quality settings may be provided to a transcoder, such as transcoder 120 of FIG. 1 for use in transcoding videos and/or video segments described herein.

Examples of systems described herein may accordingly include one or more transcoders, such as transcoder 120 of FIG. 1. The transcoder may be used to compress (e.g., encode) one or more videos and/or video segments, such as input video 102. The transcoder 120 may transcode input video 102 in accordance with data provided by the computing system 118, such as tiling configuration and quality settings. In some examples, the quality setting used for each tile of the input video 102 and/or segment thereof may be based on saliency values in the saliency map for the video and/or segment. In some examples, transcoders (e.g., codecs) may be used which comply with standard encoding and/or decoding techniques (e.g., HEVC and/or AV1 codecs).

Accordingly, systems described herein may provide one or more output videos, such as output video 122 which may be compressed (e.g., encoded). The output videos may be stored, e.g., in one or more memories and/or storage devices. Generally, the output video 122 may be smaller in size than the input video 102.

Examples described herein may be used for storage management. For example, the computing system 118 may provide storage management in accordance with the executable instructions for storage management 114. In some examples, the executable instructions for storage management 114 may be provided by a separate computing system than the computing system which was used to provide initial compression (e.g., a separate computing system from computing system 118). Examples of storage managers described herein may be used to maintain perceptual video information. Saliency metadata may be used to store perceptual data (e.g., saliency data) and a heuristic-guided search may be performed to reduce the compute load used to generate perceptual transcodings. Saliency metadata may be used to reduce full-resolution saliency map frames to a small number of bytes, and heuristic search algorithms may reduce the time taken to find a selected tile configuration (e.g., by about 30 times in some examples). Storage management described herein may generally provide transparent perceptual metadata, storage management policies, and/or a search algorithm that may reduce transcoding cost.

The output video 122 may be stored in one or more video containers. Saliency metadata may be stored together with all or portions of the output video 122 in the one or more video containers. For example, saliency metadata (e.g., perceptual metadata) may be encoded as a side channel within a video container. In a standard video container (e.g., mp4), the saliency information may be encapsulated along with video data (e.g., by the computing system 118 acting in accordance with the executable instructions for storage management 114). Using encapsulation may allow applications with and without perceptual support to decode videos stored in accordance with storage managers described herein. For example, systems or players that may not use the saliency data stored in a video container may nonetheless access and play stored video content (e.g., the saliency data may be ignored and/or discarded by the player). However, players that are capable of utilizing the saliency data may do so to control playback or other interaction with the video data. A 360 degree video player, for example, may initialize videos to be oriented in the direction of a high-saliency region as identified from saliency metadata stored in a video container, and the video data may also be played traditionally in a standard video player (e.g., VLC).

The amount of saliency metadata included in a video container may be small relative to the amount of data representing video content in the container. For example, 100 bytes of saliency metadata may be provided in some examples. The saliency metadata may be provided as a bitstring having fields for the number of rows and columns used for each tile and the saliency weights for each tile. These bitstrings typically range in size from 8-100 bytes, although other sizes may also be used.

The saliency metadata may generally include data describing some or all of the saliency map 116. Examples of saliency metadata include a tile configuration for a video segment and a saliency weight for each tile in the tile configuration. The saliency weight may refer to a saliency value for the tile. The saliency weight may be a maximum saliency value for the tile, an average saliency value for the tile, or some other combination of saliency values associated with the tile.

Storage managers described herein may operate in open and/or closed feedback loops for perceptual transcoding. For example, a storage manager implemented by computing system 118 of FIG. 1 may compress input video 102 based on saliency maps which may be provided, automatically generated, and/or generated in accordance with executable instructions for generating saliency map 112. This may be referred to as an open loop mode. In a closed loop mode, perceptually compressed video (e.g., output video 122) may be updated based on additional perceptual information, such as cues from user-end viewing devices such as headsets, video players, eye tracking, and/or other perceptual information sources.

Examples of storage managers may perform a heuristic search to improve (e.g., increase) transcoding time.

In some examples described herein, computing systems may be used to update saliency maps and/or saliency metadata stored in one or more video containers. For example, the computing system 118 of FIG. 1 may further include executable instructions for updating the saliency map 116 (which may be part of executable instructions for storage management 114 in some examples). Additional perceptual information may be obtained (e.g., from one or more input devices such as one or more augmented reality and/or virtual reality devices which may include eye tracking or other components for generating perceptual information). The additional perceptual information may be used to update the saliency map 116. For example, the computing system 118, or another computing system, may calculate a weighted average of the saliency map 116 and a saliency map based on the received perceptual information.

During operation, examples of systems described herein may compress (e.g., encode) video files and/or video segments thereof. A video file (e.g., input video 102 of FIG. 1) may be divided into multiple video segments, which may be, e.g., 10-20 seconds in length in some examples, 6-12 seconds in length in some examples, or some other time duration.

Each video segment may be divided spatially (e.g. chunked) into tiles (e.g., using the computing system 118 of FIG. 1 and in accordance with the executable instructions for selecting tiling configuration 110). Each of the tiles may correspond to a certain number of rows and columns of pixels in frames of the video segment. The tiles may be arranged in a tiling configuration. The tiling configuration may be selected, for example, by computing system 118 of FIG. 1 in accordance with executable instructions for selecting tiling configuration 110. The tiles may be compressed in accordance with multiple candidate tiling configurations and a saliency map. Metrics for the candidate tiling configurations may be evaluated (e.g., such as bitrate, video quality, or combinations thereof). A selected tiling configuration may be selected based on the metrics.

A saliency map associated with the video segments may be obtained and/or generated (e.g., by the computing system 118 of FIG. 1). In some examples, saliency map 116 may be associated with a video segment and may be generated by combining multiple intermediate saliency maps, each associated with a frame of the video segment. For example, a maximum saliency for each pixel in the frame across the plurality of intermediate saliency maps may be collected and used to generate saliency map 116.

Each of the tiles may be mapped to respective quality settings based on a saliency map associated with the video segment. For example, the computing system 118 of FIG. 1 in accordance with the executable instructions for assigning quality settings 108 may map quality settings to each of the tiles. The mapping may include assigning a target bitrate or constant rate factor to selected tiles associated with a highest subset of saliency values in the saliency map. The mapping may additionally or instead include assigning a minimum bitrate to a lowest subset of saliency values in the saliency map.

The tiles of the video segment may be compressed (e.g., encoded) in accordance with the quality settings. For example, the transcoder 120 of FIG. 1 may compress one or more video segments of input video 102 in accordance with quality settings assigned to each tile of the video segments, where the quality settings are based on the saliency map 116. In some examples, the all or a portion of the compressed video and/or video segment may be provided in a video container.

During operation, storage managers described herein may operate in an analogous manner to a large video management service. A storage manager may be used to perform compression on a per-video basis and/or across a library of videos and/or video segments. For example a storage manager may be used to reduce storage needed for a set of input videos (e.g., using the compression techniques described with reference to executable instructions for generating saliency map 112, executable instructions for selecting tiling configuration 110, and executable instructions for assigning quality settings 108).

During operation, examples of systems described herein may store compressed (e.g., encoded) video files and/or segments thereof. For example, the computing system 118 may store output video 122 in a memory, disk, or other storage apparatus. In some examples, the output video may be stored together with information regarding the saliency map used to generate the output video or portions thereof (e.g., saliency metadata). For example, saliency metadata may be included in a video container containing all or a portion of a compressed video file and/or segment. Examples of saliency metadata include a tile configuration for a video segment and a saliency weight for each tile in the tile configuration.

The stored video files and/or segments (e.g., output video 122) may be accessed by computing systems (e.g., video players) for playback, transfer, or other manipulation. For example, the computing system 118 of FIG. 1 or another computing system may access the output video 122 (e.g., over a network, such as the Internet, through a streaming service or other provider, etc.). In some examples, the output video 122 may be re-compressed using the stored saliency metadata. For example, the computing system 118 or another computing system may access the output video 122 including stored saliency metadata and may alter the association between the quality settings and the tiles. The transcoder 120 or another transcoder may re-compress the output video 122 using the updated association, which could result in an updated output video of an even smaller size than output video 122. Accordingly, a system (e.g., computing system 118 or another computing system) may receive a request to reduce a size of a compressed video and/or compressed video segment (e.g., output video 122 of FIG. 1). The quality settings may be altered responsive to such a request (e.g., by altering the saliency metadata stored with the output video 122 and/or by altering the operation of the executable instructions for assigning quality settings 108 to assign different quality settings to each tile based on the saliency map 116). The video file and/or video segmented may be re-transcoded in accordance with the updated quality settings.

Figure 2:
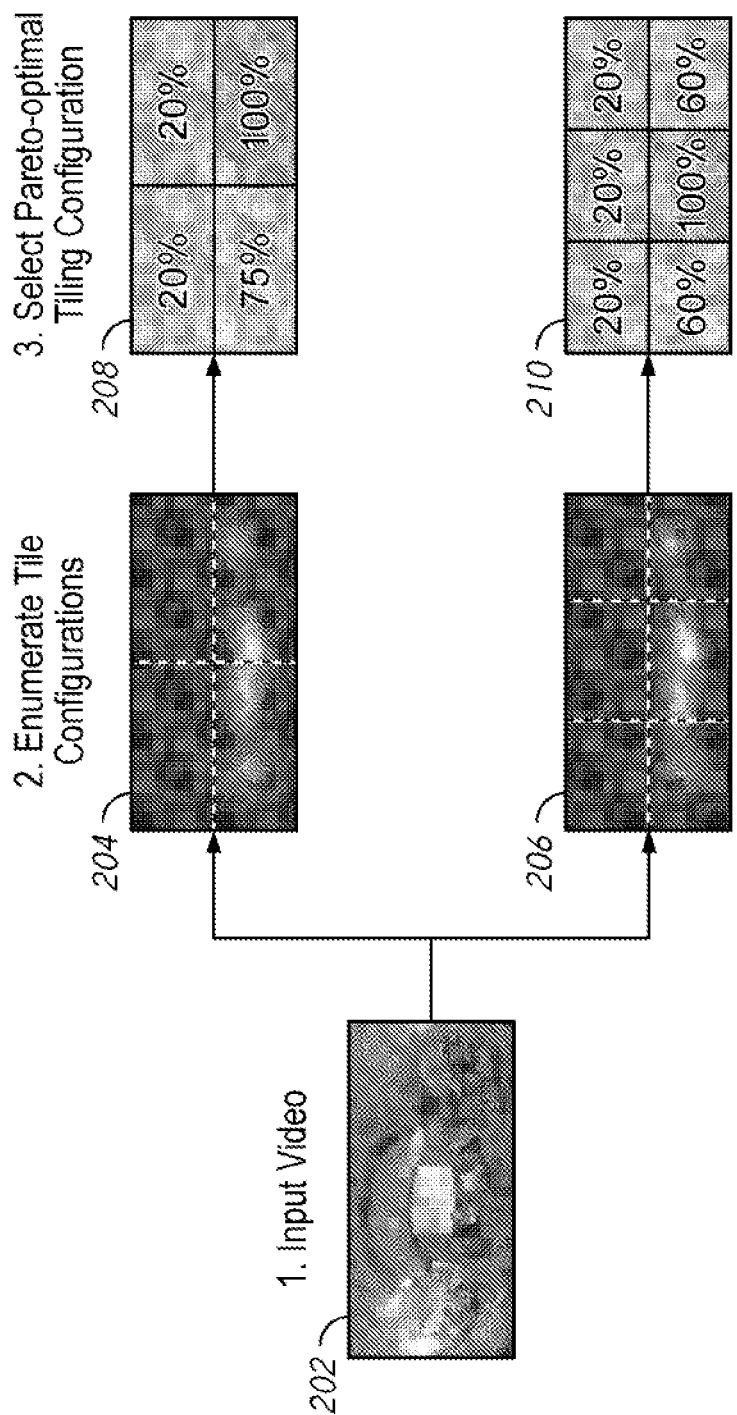
FIG. 2 is a schematic illustration of tiling configurations arranged in accordance with examples described herein.

FIG. 2 is a schematic illustration of tiling configurations arranged in accordance with examples described herein. FIG. 2 illustrates tiling configuration 204 and tiling configuration 206 for input video 202. The input video 202 may be used to implement, for example, input video 102 of FIG. 1. FIG. 2 further illustrates quality settings for the tiling configuration 204 as depicted in tiling configuration 208 and quality settings for the tiling configuration 206 as depicted in tiling configuration 210. The configurations shown in FIG. 2 are by way of example, and additional, fewer, and/or other tiling configurations may also be used. Moreover, the quality setting values shown are exemplary only, and different settings may be used in other examples.

The tiling configurations and quality settings depicted in FIG. 2 may be generated by systems described herein, such as by computing system 118 of FIG. 1 in accordance with executable instructions for selecting tiling configuration 110 and/or executable instructions for assigning quality settings 108.

In some examples, while tiling is simple and provides coding benefits, a given tile configuration can incur overheads from introducing suboptimal encoding boundaries. Recall tiles are self-contained video units that may be decoded separately. Accordingly, they may not compress information beyond per-tile boundaries. As a result, information that may be efficiently coded using partial frames in a standard encoding may need to be repeated if it appears in multiple tiles. A tile configuration may produce less efficient videos than a standard encoding pass, especially for examples of fast-moving scenes. Examples described herein may reduce and/or minimize the penalty of adding tile boundaries in areas that would benefit from being encoded together by exhaustively enumerating tile configurations in some examples. In some examples, uniform-sized tiles are considered and evaluated across all row-column pairs a video frame may allow. Some standards (e.g., the HEVC standard) may constrain the minimum size of row and column tiles, which may restrict the row-column tile configurations allowed. In some examples, the tile configurations are enumerated within a range—e.g., ranging from 2×2 to 5×10 and 10×5. The tiles may be compressed according to their saliency values, and metrics for candidate tiling configuration may be measured (e.g., the resulting bitrate and video quality achieved). A tiling configuration having particular metrics (e.g., maximum bitrate and/or quality) may be selected. An exhaustive enumeration took about 30 minutes per 15-second video to find a tile configuration in one experimental setup.

In the example of FIG. 2, an input video 202 is provided. candidate tiling configurations are shown—tiling configuration 204 and tiling configuration 206. The tiling configuration 204 includes 4 equally-sized tiles. In other examples, other numbers of tiles, other sizes, different sizes, and/or a mix of different sizes may be used. The tiling configuration 206 includes 6 equally-sized tiles. In other examples, other numbers of tiles, other sizes, different sizes, and/or a mix of different sizes may be used. Saliency map data is shown in tiling configuration 204 and tiling configuration 206 as a heat map behind the tile dividers. Note that the lower row of tiles pertains to areas of higher saliency (e.g., are associated with brighter regions of the saliency heat map depicted in FIG. 2).

Tiles of the candidate tiling configurations may be assigned quality settings. The tiling configuration 208 illustrates quality settings for tiling configuration 204. The tiling configuration 210 illustrations quality settings for tiling configuration 206. In the example of FIG. 2, a maximum saliency value in a tile may be used to select a quality setting for the tile. Other mappings are also possible. For example, an average saliency value for a tile may be used to select a quality setting for the tile. In some examples, a weighted average of saliency values in the tile may be used (e.g., variability in saliency values within the tile may be taken into consideration). In tiling configuration 208, the lower right tile includes pixels having the maximum saliency value of the saliency map. Accordingly, the lower right tile is provided a maximum quality metric, indicated by 100% in FIG. 2. This may be, for example, a target bitrate. A maximum saliency value of the lower left tile may be 75% of the maximum saliency value for the frame, so a 75% quality metric may be assigned (e.g., 75% of the target bitrate). The upper tiles are associated with the lowest saliency values of the saliency map and may be assigned a minimum quality metric (e.g., 20% in the example of FIG. 2).

The tiling configuration 210 includes six tiles. The center tile of the bottom row may include the pixel having the highest saliency value in the saliency map. Accordingly, the center tile in the bottom row may be assigned a 100% quality metric (e.g., a target bitrate). The left and right tiles in the bottom row may each be associated with a saliency value having 60% of the maximum saliency value of the frame. Accordingly, the left and right tiles in the bottom row are assigned a quality metric of 60% (e.g. 60% of the target bitrate). All three tiles in the upper row are associated with the lowest saliency values of the frame in the saliency map. Accordingly, all three upper row tiles may be assigned a minimum quality metric (e.g., 20% in the example of FIG. 2). The target bitrate and minimum quality metric may be user-defined and/or may be defined by a codec used in the system.

To select a tiling configuration, systems described herein may encode a video and/or video segment using the candidate tiling configurations (e.g., tiling configuration 208 and tiling configuration 210 of FIG. 2). Metrics of the resulting encoded video and/or video segment may be evaluated (e.g., bitrate and/or video quality). Based on the metrics, a particular tiling configuration may be selected for use in compressing the video.

Figure 3:
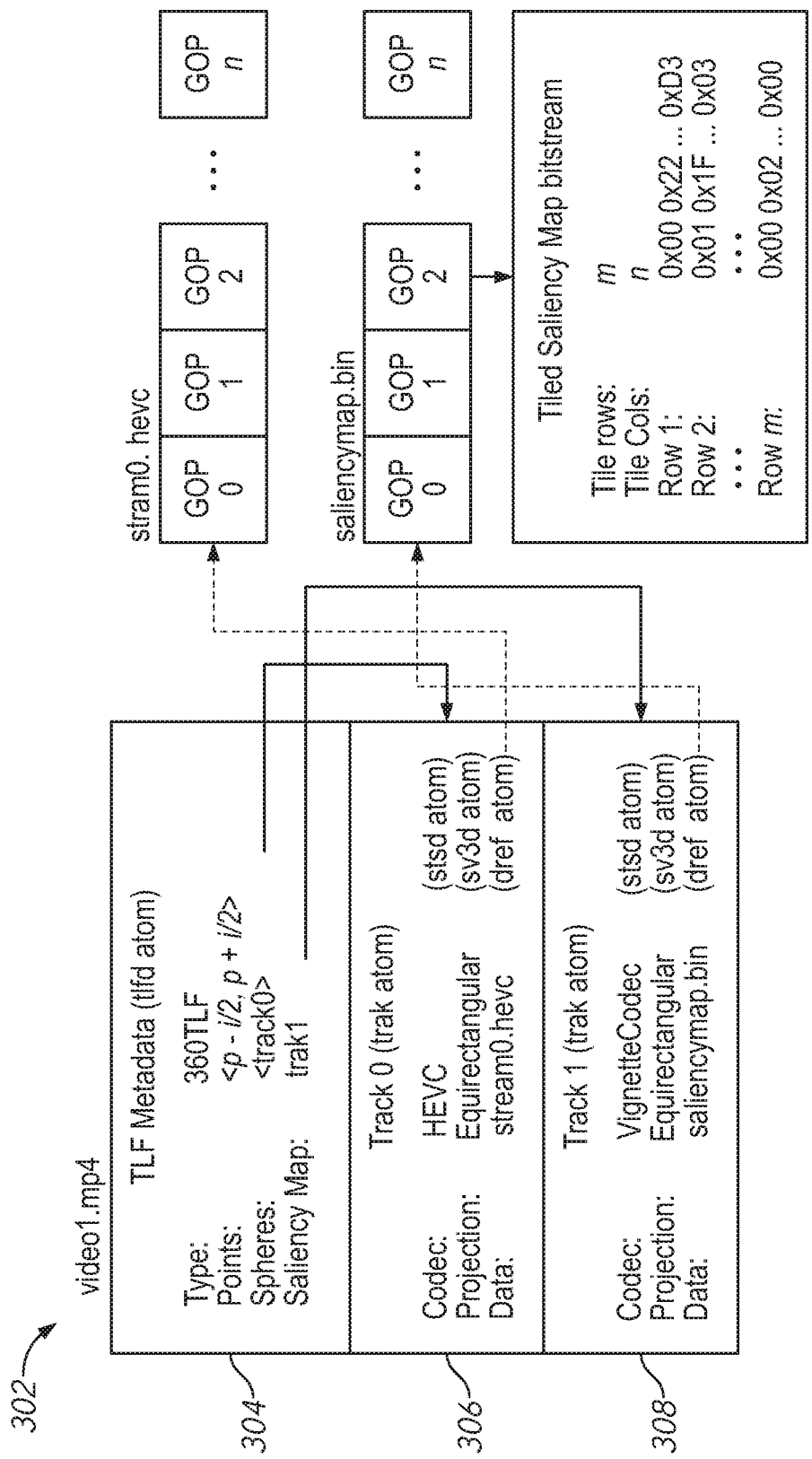
FIG. 3 is a schematic illustration of a video container and bitstreams arranged in accordance with examples described herein.

FIG. 3 is a schematic illustration of a video container and bitstreams arranged in accordance with examples described herein. The example of FIG. 3 depicts a layout of video metadata in LightDB. Other layouts, bitstreams, file structures, or database structures may be used in other examples. The video container and metadata structures shown in FIG. 3 may be used, for example, to store output video 122 of FIG. 1 and may be generated by computing system 118 of FIG. 1.

The example of FIG. 3 illustrates metadata for video container 302. Metadata 304 may include a reference to a trak (e.g., an atom) of saliency metadata (such as data representing a saliency map). The video container 302 may include any number of traks (e.g., atoms) having video data, such as video data track 306. The video data traks may be used to generate a video data stream (e.g., stream0.hevc in FIG. 3). The saliency metadata track 308 may be used to describe a saliency map (e.g., saliencymap.bin in FIG. 3). The saliency map may describe a tiled saliency map bitstream, specifying the location of tiles relative to the bitstream.

Figure 4:
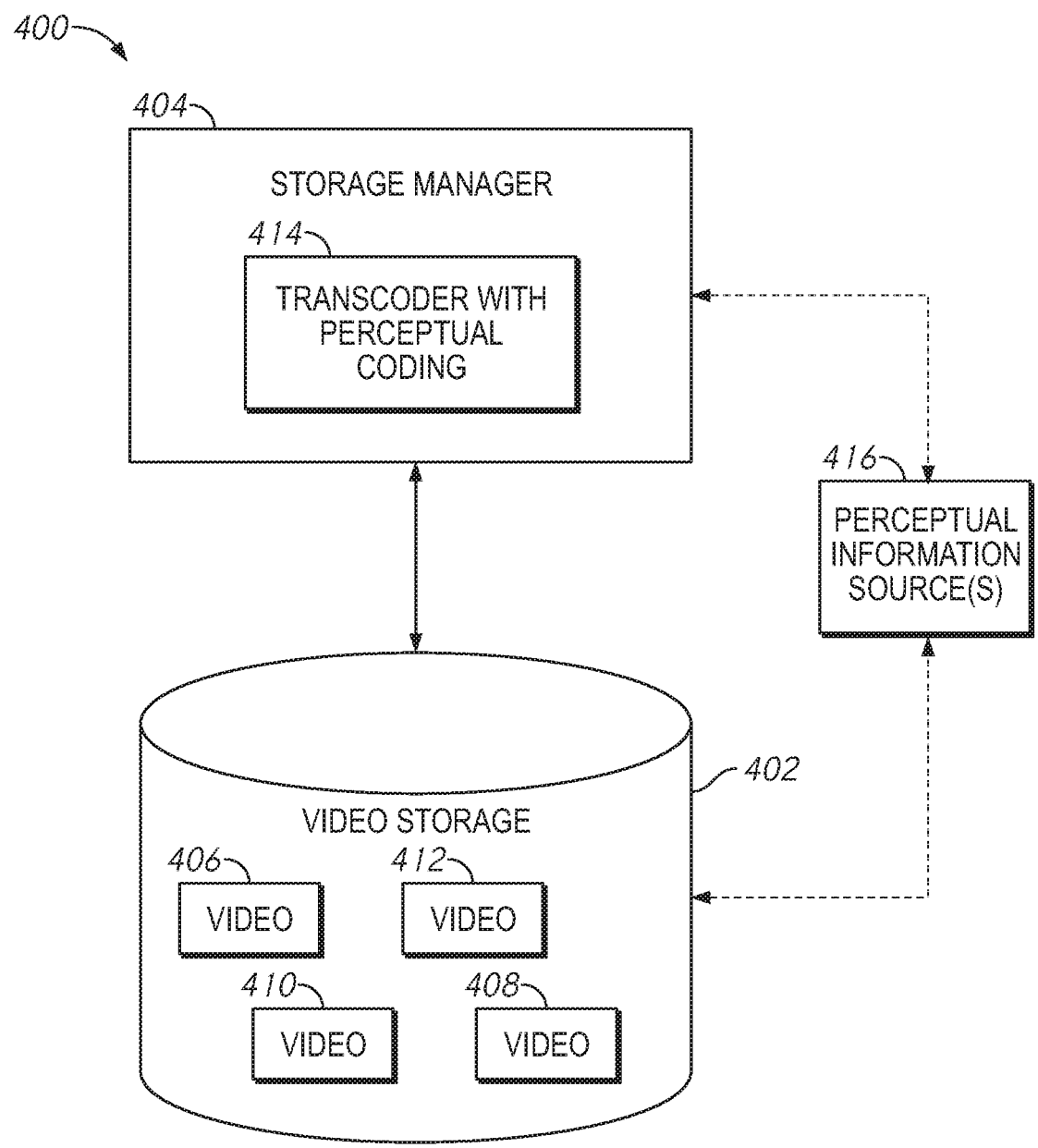
FIG. 4 is a schematic illustration of a system arranged in accordance with examples described herein.

FIG. 4 is a schematic illustration of a system arranged in accordance with examples described herein. The system 400 may include video storage 402, storage manager 404, and/or perceptual information source(s) 416. The video storage 402 may include video 406, video 408, video 410, and/or video 412. The storage manager 404 may include transcoder with perceptual coding 414. The components shown in FIG. 4 are by way of example only, and additional, fewer, and/or different components may be used in other examples.

The storage manager 404 may be implemented in some examples using all or portions of computing system 118 and/or transcoder 120 of FIG. 1. Any of the videos shown in FIG. 4 may be implemented using input video 102 and/or output video 122 of FIG. 1 in some examples.

The storage manager 404 may be implemented using one or more processor(s) and executable instructions stored on one or more computer readable media (e.g., memory, disks, etc.). For example, the storage manager 404 may be wholly and/or partially implemented in software. The transcoder with perceptual coding 414 may be implemented using one or more codecs (e.g., an HEVC codec in some examples). Generally, the transcoder with perceptual coding 414 may receive saliency data (e.g., from a saliency map and/or saliency metadata) and transcode videos and/or video segments by encoding tiles in accordance with a quality setting assigned to the tile based on the saliency data.

The video storage 402 may be implemented using one or more storage devices. In some examples, a large array of storage devices may be managed by the storage manager 404 (e.g., storage of a content delivery network, enterprise provider, and/or social media repository). Any number of storage devices may be used, and any number of videos may be stored on those storage devices in any configuration—e.g., distributed across the storage devices with redundancy.

The storage manager 404 may perform compression of videos uploaded to and/or provided in video storage 402. For example, the storage manager 404 may receive an indication a new video has been provided in video storage 402 (e.g., by another computing system or process). The storage manager 404 may then initiate compression of the new video in accordance with techniques described herein for perceptual coding. The storage manager 404 may initiate compression of sets of videos (or all videos) stored in video storage 402 in some examples. For example, the storage manager 404 may receive an indication that a certain threshold is met (e.g., available storage capacity in video storage 402 is below a threshold and/or a particular video has decreased in popularity based on access statistics reported to storage manager 404 by another process). Responsive to the indication that the threshold is met, the storage manager 404 may initiate compression and/or re-compression of all or selected videos in the video storage 402. In this manner, the storage manager 404 may be used to decrease the stored size of videos whose popularity (e.g., access frequency) has declined, and/or to ensure certain available storage space is maintained in video storage 402.

The storage manager 404 may be accessed through an exposed application programming interface (API) in some examples. The API may provide functions to support the open- and closed-loop modes of operation described herein. Table 1 shows an example programming interface for storage manager 404.

TABLE 1

Storage Manager API

| Function | Compression Type | Data required |
|---|---|---|
| transcode | General | <IN video, IN CRF/target bitrate, OUT video> |
| vignette_transcode | Perceptual | <IN video, (IN CRF/target bitrate,) OUT video, OUT saliency metadata> |
| vignette_squeeze | Perceptual | <IN video, IN CRF/target bitrate, OUT video> |
| vignette_update | Perceptual | <IN video, IN fixation map, OUT video, OUT saliency metadata> |

The table manager API may include a variety of operations, both general and/or related to perceptual encoding. A transcode operation may be provided (e.g., transcode of Table 1). A perceptual transcode operation may be provided (e.g., vignette_transcode of Table 1). A size reduction operation for re-compression may be provided (e.g., vignette_squeeze of Table 1). An update operation may be provided (e.g., vignette_update of Table 1). Generally, each operation may take as input a video and/or video segment and certain parameters and output a video and/or video segment with generated perceptual metadata encapsulated in the video container. The storage manager API may be included, for example, as a shared library linked into a database system, such as LightDB.

Accordingly, storage policies, conditions, or other interface applications (e.g., software) may be provided which may call to storage manager functions (e.g., using an API) when desired for a video or video library. For example, a social media service could apply perceptual compression as videos decrease in popularity to reduce storage capacity. A VR video-on-demand service that ingested eye tracking information could apply perceptual compression as new perceptual information is collected for certain videos. Other applications are possible in other examples.

Storage managers described herein may accordingly provide transcode functions (e.g., in accordance transcoder with perceptual coding 414 of FIG. 4 and/or transcoder 120 of FIG. 1). Transcode operations may generally be viewed as a basic storage manager function, video transcoding. When a new video is uploaded or otherwise provided to the storage system (e.g., video storage 402), a storage manager (e.g., storage manager 404) may receive a notification of the addition and/or observe the addition through monitoring of the video storage, and may initiate a transcode operation (e.g., through transcode( ) of Table 1) to transcode the video to specified bitrates and formats for content delivery. The transcode operation may take as input a video and target quality parameter, expressed either by CRF or bitrate in some examples, and provide a regularly transcoded video.

In addition to or instead of regular transcoding, examples of storage managers described herein may provide saliency-based transcoding (e.g., perceptual transcoding). A perceptual transcode operation may accordingly be provided (e.g., vignette_transcode( ) of Table 1). A perceptual transcode operation may be a default saliency-based API call. The perceptual transcode operation may receive as input a video and/or video segment and an optional quality or bitrate target, and produce as output both a video and/or video segment and its corresponding generated saliency metadata. When perceptual transcoding is triggered, the storage manager may generate new and/or updated saliency maps, and then compress the video and/or video segment according to the specified target quality.

Transcode functions for storage managers described herein (e.g., general and perceptual transcode operations) may use similar signatures, facilitating easily switching between regular and perceptual compression in accordance with the needs of a particular storage system. Providing saliency information as a metadata stream included in video container may allow for transparency to saliency-agnostic applications or commands like mediainfo or ffprobe. Existing commands that utilize video data may operate seamlessly with video containers having saliency metadata encoded in the video container as a separate trak or atom, because the existing command simply may not access, request, and/or use that saliency metadata trak. The use of the remaining traks may be unaffected.

Compression techniques described herein (e.g., with reference to FIG. 1) may map saliency to quality levels for each tile. The storage manager 404 may re-compress and/or compress a video and/or video segment using saliency-based compression. A size reduction operation (e.g., vignette_squeeze of Table 1) may be used to re-compress a video using a specified, reduced bitrate or quality threshold. The operation may take as input a video and/or video segment, bitrate, and saliency mapping (e.g., relationship between saliency values for a tile and quality settings for the tile). The size reduction operation may provide as output a newly compressed video. For instance, vignette_squeeze (input.mp4,100 k) may transcode a previously saliency-encoded video (e.g., video 410) from a higher bitrate to a maximum of 100 kbps in the most salient regions. The vignette_squeeze( ) function may recompress videos from a higher quality mapping to a lower one. For example, the size reduction operation may access saliency metadata stored with the video container, and may adjust the mapping between saliency values for tiles and quality settings. The operation may result in a transition from a higher quality mapping to a lower quality one, resulting in a reduction in size. Generally, the operation will not transcode low-quality videos to a higher-quality mapping to reduce and/or avoid encoding artifacts. The size reduction operation may execute transcoding and/or compression using already-generated saliency metadata. In some examples, it may not be necessary to update or generate new saliency metadata. Accordingly, a system or other process may utilize the storage manager 404 to invoke a size reduction operation in a variety of contexts, such as video data is sent to a smaller cache and/or in preparation for distribution to devices with smaller displays.

The storage manager 404 may operate in some examples in a "closed-loop" mode, where saliency maps and/or data may be updated with new perceptual information from eye tracking devices and/or other perceptual information sources. To invoke this mode, the storage manager 404 uses an update operation (e.g., vignette_update( ) of Table 1) to ingest and re-process videos with new perceptual information. Eye tracker maps, similar in format to the saliency maps used in compression techniques described herein, may be converted to an input analogous to a saliency map. In an analogous manner to how systems described herein may construct per-video saliency maps, the storage manager 404 may update the video' saliency map with eye tracker information and/or other additional perceptual information by executing a weighted average of the original map and the additional perceptual information (e.g., input eye tracker map). The update function may take in a fixation map and generate a new metadata bitstream of saliency information that is attached to the video container.

In some examples, systems described herein may have overhead in the form of searching over tile configurations for a given video and/or video segment, such as when an exhaustive search is used. This search may be performed once, upon video upload, but may consume significant processing time in some examples. Accordingly, in some example systems, such as storage manager 404, a lower-impact search algorithm may be used which may offer a performance improvement (e.g., a 30× improvement in some examples) over an exhaustive search. Depending on available resources, a system could choose the exhaustive search for optimal results or heuristic-guided search for faster processing. Other search techniques may also be used. The search techniques described with reference to FIG. 4 may be performed, e.g., by storage manager 404, but may also be performed by computing system 118 of FIG. 1. For example, the executable instructions for selecting tiling configuration 110 may include instructions for performing a search as described herein with reference to FIG. 4 (e.g., using a heuristic search).

An example search technique uses motion vector information from encoded video streams to estimate a size of video tiles for use in a candidate tiling configurations and/or a selected tiling configuration. Candidate tile configurations may be generated in this manner that group regions of high motion together, and a tile configuration may be selected that minimizes the difference in motion vector values across tiles. This heuristic approximates the observation that high-motion areas should not be divided across multiple tiles.

In operation, motion vector information may be extracted from encoded videos (e.g., by a computing system operating a motion vector extraction process such as MPEGflow). Using MPEGflow may presuppose transcoding a video to generate motion vector information. Computing systems described herein may evaluate tile configurations for motion vectors. The search may evaluate a metric (e.g., the average standard deviation) for tiles under candidate tiling configurations and select the configuration with a particular metric value (e.g., the minimum deviation of motion vectors in each tile). This heuristic of using standard deviation of motion vectors within a tile may approximate the information sought during exhaustive encoding but may use much less computation. Further, this technique may be able to select tile configurations able to encapsulate redundant motion or frequency information with a single tile, rather than repeat it across tiles. Compared with an exhaustive search, which can transcode a video hundreds of times to empirically produce optimal tile configurations, a search heuristic may produce a result faster than the exhaustive method and the result may be compelling—e.g., within 1 dB of the best-PSNR result when executed over the example videos in some examples.

WORKED EXAMPLE

An evaluation of techniques described herein was conducted using particular datasets, quality metrics, and a technical setup.

An example storage manager described herein was implemented by extending LightDB, a database management system for VR videos. LightDB lets developers declaratively express queries over large-scale video and uses a rule-based optimizer to maximize performance. Developers can express HEVC-based saliency encoding in LightDB's query language by combining its Encode, Partition, and Subquery operators. An example of which may be written as:

```
Decode("rtp://...")
>> Partition(Time, 1, Theta, p / rows, Phi, 2p / cols)
>> Subquery([ ](auto& partition) {
    return Encode(partition, saliency_mapping(partition) })
>> Store("output");
```

In this example, Partition divides the input video into tiles, Encode transcodes each tile with the corresponding saliency_mapping value as an argument, and Subquery executes the given operation over all the partitioned tiles. MLNet was used to generate saliency maps and weights trained on the SALICON dataset. This saliency classifier achieved 94% accuracy compared to the human-annotated baseline on the MIT300 saliency benchmark.

The example system implementing saliency coding was evaluated against the HEVC encoding implementations included with FFmpeg. FFmpeg was configured with support for NVENCODE GPU-based encoding of HEVC video, as it is supported by large-scale video services and devices. Compression techniques described herein were implemented on top of FFmpeg version n4.1-dev, and the GPU-based NVENC HEVC encoder was used for tiled encoding. Unless otherwise specified, a constrained bitrate was targeted using maximum bitrate mode (VBV) to rapidly generate results.

Experiments were performed on a single-node server running Ubuntu 16.04 and containing an Intel i7-6800K processor (3.4 Ghz, 6 cores, 15 MB cache), 32 GB DDR4 RAM at 2133 MHz, a 256 GB SSD drive (ext4 file system), and a Nvidia P5000 GPU with two discrete NVENCODE chipsets.

A collection of video datasets were used to evaluate the techniques. Video encoding research uses quantitative quality metrics to measure the perceptual impact of compression on videos. Quality was assessed using two quality metrics, PSNR and EWPSNR. Peak signal-to-noise ratio (PSNR) reports the ratio of maximum to actual error per-pixel by computing the per-pixel mean squared error and comparing it to the maximum per-pixel error. PSNR is popular for video encoding research, but researchers acknowledge that it may fail to capture some obvious perceptual artifacts. Acceptable PSNR values fall between 30 and 50 dB, with values above 50 dB considered to be lossless in some examples.

For saliency prediction evaluations, researchers use eye-weighted PSNR (EWPSNR), a PSNR-based metric that more accurately represents human saliency perception. EWPSNR prioritizes errors perceived by the human visual system rather than evaluating PSNR uniformly across a video frame. As ground truth, EWPSNR was computed using the per-video saliency maps as described herein.

To evaluate the storage and bandwidth benefits of the example system, compression techniques described herein were applied to a corpus of videos. The video library was transcoded at iso-bitrate in salient regions and decreased bitrate linearly with saliency to a minimum 10% target bitrate in the lowest saliency tiles. In these experiments, the transcoding was evaluated across a range of resolutions and workloads, as is expected in a video storage system.

The impact of tiling on compression benefits was examined using a fixed saliency map. An exhaustive tile configuration search was used and all tile sizes evaluated to identify an optimal number of tiles for each video. Given a fixed saliency map, optimal tile configurations were identified to maximize storage savings and quality varied based on entropy and video content. Some videos benefited from many small tiles, while others performed best with fewer large tiles.

The smallest tile size evaluated was 64 pixels in breadth, but most videos performed best with tiles having a breadth of 300-400 pixels. The experiment indicated that the optimal tile configuration for a video may be content dependent and can vary from four tiles to forty in some examples, and that tile configuration may have an impact on tile-based compression.

Peak compression, bandwidth, and quality savings were explored by applying the example system to a video corpus and evaluating compression and quality savings. The results of the exhaustive tile search to identify the best compression-quality configurations for each video. Overall, the system produced videos that were 1-15% of the original size when maintaining the original bitrate in salient regions. These compression savings include the fixed overhead of perceptual metadata, which is <100 B for all videos. Datasets with higher video resolutions demonstrated the highest compression savings. One dataset, which was algorithmically chosen to have a wide variance in resolution and entropy, exhibited a commensurately large variance in storage reduction. Of the videos with the lowest storage reduction, each tended to have low entropy, large text, or other 2D graphics that are already efficiently encoded.

Our results indicated that EWPSNR results were near-lossless for each benchmark dataset, while the PSNR values—which do not take the human visual processing system into account—nonetheless remain acceptable for viewing. Visual observations indicated that the system provided acceptable quality for its compression benefit.

To understand the impact of saliency compression on common video system workloads, quality of service (QoS) delivered by the system for two applications were evaluated: entertainment streaming with a user study and evaluation of a video analytics application that performs object recognition. These applications optimize for different QoS metrics: perceptual quality for entertainment video, and throughput and accuracy for object recognition.

A user study was performed to quantify viewer perception of the saliency-based compression. The study presented users with two versions of the same video: one encoded with HEVC at 20 Mbps, the other with a system utilizing saliency-based encoding in accordance with examples described herein. The videos generated with the saliency-based encoding system were randomly chosen to be either 1 Mbps, 5 Mbps, 10 Mbps, or 20 Mbps. The study asked users their preference between the matched pairs for 12 videos. The bitrate of the saliency-coded videos varied randomly across the questionnaire. The goal was to discover if viewers preferred saliency coded videos to HEVC, and, if so, if those preferences are more or less pronounced at different bitrate levels.

The 12 videos shown included examples selected to cover a range of entropy levels. Each video was encoded at a target bitrate (1 Mbps, 5 Mbps, 10 Mbps, or 20 Mbps), and the questionnaire randomly selected which bitrate to serve. The questionnaire was distributed as a web survey and ensured videos played correctly in all browsers by losslessly re-encoding to H.264. When videos were saliency encoded at 1 Mbps in the most salient regions, 72% users preferred the HEVC baseline. However, for perceptually encoded videos encoded at 5, 10, and 20 Mbps, users either could not tell the difference between HEVC and the system, or preferred the system's videos 60%, 79%, and 81% of the time, respectively. This suggests that video systems can deliver saliency-encoded videos at 50-75% lower bitrate with little perceived impact.

Video storage and processing systems often perform analytics and machine learning tasks on their video libraries at scale. To evaluate any performance degradation in latency or quality from using systems described herein, the system was evaluated while running YOLO, a popular fast object recognition algorithm. A comparison was made against baseline HEVC-encoded videos to evaluate if the system incurred any additional cost in a video processing setting. Using saliency-compressed videos provided some speedup when decoding videos for object recognition, but this benefit may be overshadowed by the cost of running YOLO. Examining accuracy, we find that videos encoded with systems described herein may maintain 84% accuracy on average, compared to the baseline HEVC videos. Accuracy on the YOLO task was lowest for the videos in the VR360 suite, and tends to correspond to the areas where the video is distorted from the equirectangular projection. While saliency-compressed videos can provide slight benefits for video analytics latency, especially if video decoding is the system bottleneck, saliency-based compression may be optimized specifically for video analytics.

Saliency-based compression described herein may have the additional processing overhead of running a neural network to generate and update saliency maps. Storage managers described herein can switch between an exhaustive or heuristic tile configuration search to uncover optimal tile configurations for a video. Latency of the combined saliency and transcoding pipeline was benchmarked in two modes: exhaustive, which generates saliency maps for each frame and exhaustively evaluates tiling, and heuristic, which uses the heuristic search algorithm to select a tile configuration.

Saliency map generation with MLNet dominates computation time. This step, however, needs only to be performed once per video, and is off the critical path for video streaming workloads; it also runs as unoptimized Theano code that could be likely be improved by a high-performance machine learning library. A heuristic search was 33× faster than an exhaustive search, and produces tile configurations within 0.25 dB of the best-PSNR choice.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
   generating a single saliency map associated with a video segment, comprising:
   collecting a maximum saliency value for each of a plurality of pixels across a plurality of frames in the video segment; and obtaining aggregated saliency values based on the collected maximum saliency value for each of the plurality of pixels across the plurality of frames in the video segment;
selecting a tiling configuration for the video segment from a plurality of candidate tiling configurations, said selecting comprising:
  determining a quality setting for each tile in each of the candidate tiling configurations, the quality setting based on a saliency value at each tile in the saliency map, including assigning at least one of a target bitrate or constant rate factor to selected tiles associated with a highest subset of saliency values in the saliency map or a minimum bitrate to a lowest subset of saliency values in the saliency map;
  compressing the tiles in accordance with the multiple candidate tiling configurations and the saliency map; and
  selecting at least one of the multiple candidate tiling configurations as a selected tiling configuration based on evaluating metrics for the multiple candidate tiling configurations, the metrics including at least one of bitrate, video quality, or combinations thereof;
and
encoding the tiles in accordance with the selected tiling configuration.

2. The method of claim 1, wherein generating the saliency map associated with the video segment comprises combining a plurality of intermediate saliency maps.

3. The method of claim 1, wherein said determining comprises assigning a target bitrate or constant rate factor to selected tiles associated with a highest subset of saliency values in the saliency map.

4. The method of claim 1, wherein said determining comprises assigning a minimum bitrate to a lowest subset of saliency values in the saliency map.

5. The method of claim 1, further comprising generating a tiled saliency map bitstream based on the saliency map, wherein the tiled saliency map bitstream is configured to specify a location of a particular tile among the tiles.

6. A system comprising:
at least one processor;
at least one computer readable media encoded with instructions, which, when executed, cause the at least one processor to perform operations comprising:
  generating a single saliency map based on an input video segment, comprising:
    collecting saliency for each of a plurality of pixels across a plurality of frames in the video segment; and
    obtaining aggregated saliency values based on the collected maximum saliency value for each of the plurality of pixels across the plurality of frames in the video segment;
  selecting a tiling configuration for the video segment from a plurality of candidate tiling configurations, said selecting comprising:
    determining a quality setting for each tile in each of the candidate tiling configurations, the quality setting based on a saliency value at each tile in the saliency map, including assigning at least one of a target bitrate or constant rate factor to selected tiles associated with a highest subset of saliency values in the saliency map or a minimum bitrate to a lowest subset of saliency values in the saliency map;
    compressing the tiles in accordance with the multiple candidate tiling configurations and the saliency map; and
    selecting at least one of the multiple candidate tiling configurations as a selected tiling configuration based on evaluating metrics for the multiple candidate tiling configurations, the metrics including at least one of bitrate, video quality, or combinations thereof;
  a transcoder configured to transcode the input video segment in the tiles in accordance with the associated quality settings to provide a compressed video segment.

7. The system of claim 6, wherein the operations further comprise storing the compressed video segment in a video container including saliency metadata comprising a saliency weight for each of the tiles.

8. The system of claim 6, wherein the operations further comprise:
receiving a request to reduce a size of the compressed video segment; and
altering the quality settings responsive to the request to provide updated quality settings,
wherein the transcoder is further configured to re-transcode the compressed video segment in accordance with the updated quality settings.

9. The system of claim 6, wherein the operations further comprise:
receiving additional perceptual information; and
updating the saliency map based on the additional perceptual information to provide an updated saliency map.

10. The system of claim 6, wherein the system comprises a cloud-based service configured to receive the input video segment from an external source.

11. The system of claim 6, wherein the operations further comprise generating a tiled saliency map bitstream based on the saliency map, wherein the tiled saliency map bitstream is configured to specify a location of a particular tile among the tiles.

* * * * *